United States Patent [19]

Mattson

[11] Patent Number: 4,568,259
[45] Date of Patent: Feb. 4, 1986

[54] TIRE MOLD

[75] Inventor: William F. Mattson, Hinckley, Ohio

[73] Assignee: The B. F. Goodrich Company, Akron, Ohio

[21] Appl. No.: 761,715

[22] Filed: Aug. 2, 1985

[51] Int. Cl.⁴ .............................................. B29H 5/02
[52] U.S. Cl. .................................... 425/40; 425/28 R; 425/46
[58] Field of Search .................... 425/28 R, 40, 41, 46

[56] References Cited

U.S. PATENT DOCUMENTS

| | | | |
|---|---|---|---|
| 1,914,853 | 6/1933 | Grange | 425/41 X |
| 2,509,830 | 5/1950 | MacMillan | 425/40 X |
| 2,581,939 | 1/1952 | Deist et al. | 425/28 R |
| 3,429,005 | 2/1969 | MacMillan | 425/41 X |
| 3,479,693 | 11/1969 | Cantarutti | 425/40 |
| 4,446,093 | 5/1984 | Mattson | 425/28 R X |
| 4,447,193 | 5/1984 | Bartley et al. | 425/28 R |

FOREIGN PATENT DOCUMENTS 58-49232  3/1983  Japan .

Primary Examiner—J. Howard Flint, Jr.
Attorney, Agent, or Firm—Philip P. McCann; Harry F. Pepper, Jr.

[57]         ABSTRACT

Disclosed is a tire mold for curing pneumatic tires wherein the mold includes a mold back, a tread ring and an insulator plate located between the mold back and the tread ring. The insulator plate is made of material that has a lower thermal conductivity than the thermal conductivity of the material in the mold back or tread ring. The addition of the insulator plate between the mold back and the tread ring induces reduction in heat transfer between the mold back and the tread ring allowing the maintenance of higher heat transfer for areas of the tire not shielded by the insulator plate and achieving the lower heat transfer in the area of the tire shielded by the insulator plate.

9 Claims, 4 Drawing Figures

TIRE MOLD

BACKGROUND OF THE INVENTION

This invention relates to an apparatus for vulcanizing or curing elastomeric articles and more particularly to an apparatus for curing pneumatic tires.

The standard process for converting uncured or "green" rubber into a product that will resist heat and cold in addition to having considerable mechanical strength is called vulcanizing or curing. The rubber used in a pneumatic tire is generally prepared for the vulcanization process by adding sulphur and/or other vulcanizing agents such as accelerators to the rubber. Thereafter, the tire is built of various components including a carcass body made up of plies of reinforcement cords buried in rubber. The built tire before vulcanization is known in the art as a green tire.

A process to cure the rubber in the tire includes (1) placing the green tire over a bladder in a tire mold whereafter the (2) green tire is shaped by pressure from a high temperature fluid, such as steam or hot water, for a brief period of time effecting the tire to expand radially outwardly. The curing apparatus is then closed and the curing bladder is further expanded outwardly by the pressurized high temperature fluid, forcing the tire into the mold and subjecting the tire to heat and pressure of a high temperature fluid for a predetermined time.

During the curing period, the pressurized high temperature fluid is provided in the curing bladder until the cure is completed wherein the heat transferred to the tire from high temperature fluids in the bladder is generally called internal curing. Also, high temperature fluid such as steam is provided externally of the tire during the curing cycle which is generally referred to as external cure.

The high temperature fluid is supplied from conventional sources located internal and external of the tire wherein the external heat is transmitted through the mold to the tire. In particular, one conventonal source for the external high temperature fluid is a chamber in the mold, often referred to as a steam chamber. As a result of the material and geometrical properties of the mold and the tire, various parts of a tire receive different amounts of cure during normal curing operations.

The amount of heat transferred to the tire through the mold is directly dependent on the temperature gradient across the mold, the thickness of the mold between the steam chamber and the interface with the tire and the heat transfer characteristics of the material in the mold, in particular the thermal conductivity characteristics of the material. The heat transferred through a mold made of one material can be expressed as:

$$Q = \frac{kA(T_2 - T_1)}{(x_2 - x_1)} \quad (1)$$

where
- k = thermal conductivity characteristics of the material BTU/Ft.-hr-°F. (kcal/m-hr-°C.)
- A = cross-sectional area of the mold, Ft² (m²)
- $T_2$ = temperature of the mold at location $x_2$, °F. (°C.)
- $T_1$ = temperature of the mold at location $x_1$, °F. (°C.)
- $x_2$ = distance coordinate of heat energy, Ft (m)
- $x_1$ = distance coordinate of heat energy, Ft (m)

The heat transferred through a mold as expressed in equation (1) is directly proportional to the value of the thermal conductivity, k, of the material in the mold. Therefore, the higher the value of the thermal conductivity of the material, the more heat that will be transferred from the heat source to the tire. The thermal conductivity of aluminum, a material generally used in molds, is approximately 120 BTU/Ft.-hr-°F. at 212° F. (178.8 kcal/m-hr-°C. at 100 C.°) whereas the thermal conductivity of a mold made of steel is about 20 to about 30 BTU/Ft-hr-°F. at 212° F. (about 29.8 to about 44.8 kcal/m-hr-°C. at 100° C.) whereas the thermal conductivity through air at 212° F. (100° C.) is approximately 0.017 BTU/Ft-hr-°F. at 212° F. (0.025 kcal/m-hr-°C. at 100 C.°).

In the mold containing a mold back and a replaceable tread ring, the heat flows from the steam chamber through the mold back and through the tread ring into the tire. The amount of heat transferred in this mold will be affected by the thermal conductivity of the materials in both the mold back and tread ring. In a conventional mold, the materials in the mold back and tread ring are similar, resulting in an assumption that the heat flow is similar to that in a mold where there is no replaceable tread ring (i.e., the mold back and tread ring are one) assuming the fit between the mold back and tread is tight enough to exclude air.

The rubber compositions in the various parts of a tire require different amounts of cure and/or different temperatures for optimum property development. For example, the temperature required in the tread area of a tire may be less than the temperature desired for the bead area as found in low rolling resistance tires. It has been found in particular in low rolling resistance tires that temperatures in the range of about 300° F. (149° C.) to about 320° F. (160° C.) applied to the tread area result in undesirable increased rolling resistance of the rubber in the tread area whereas a temperature in the range of about 280° F. (138° C.) to about 290° F. (143° C.) result in the desirable low rolling resistance of the rubber in the tread area. However, reduction of temperature of the external cure temperature to about 280° F. (138° C.) to about 290° F. (143° C.) has resulted in undercuring in the bead area of a low rolling resistance tire.

Presently, the requirement of lower temperature in areas of the tire, and in particular in the tread area, is accomplished by reducing the temperature of the external high temperature fluid. Associated with this lower temperature is a production loss because of the overall longer time required to cure the complete tire.

SUMMARY OF THE INVENTION

It is an object of the present invention to provide an improved apparatus for curing elastomeric articles and more particularly, an apparatus for curing pneumatic tires. It is a further object of the present invention to provide an apparatus for curing pneumatic tires that provides a more desirable cure and provide for increased productivity of the curing process.

The apparatus or tire mold for curing pneumatic tires of the present invention includes a circumferential parting line which divides the mold into upper and lower sections with at least one of the sections being movable in a direction perpendicular to said parting line. Each section of the mold includes two components such as a tread ring and mold back wherein the tread ring and the mold back are of material with a specific thermal conductivity. Each section further includes an insulator plate which is disposed between the mold back and tread ring and between said tire and heat source external of said tire wherein the insulator plate has a thermal conductivity less than the thermal conductivity of the tread ring or mold back.

The tire mold of the present invention allows for the maintenance of higher temperatures of the external curing fluid reducing the overall cure time of a tire. In addition, the insulator plate can be designed to a specific thermal conductivity to allow for a desired cure to be attained in both the tread area and other areas of the tire at approximately the same time.

DETAILED DESCRIPTION

Figure 1:
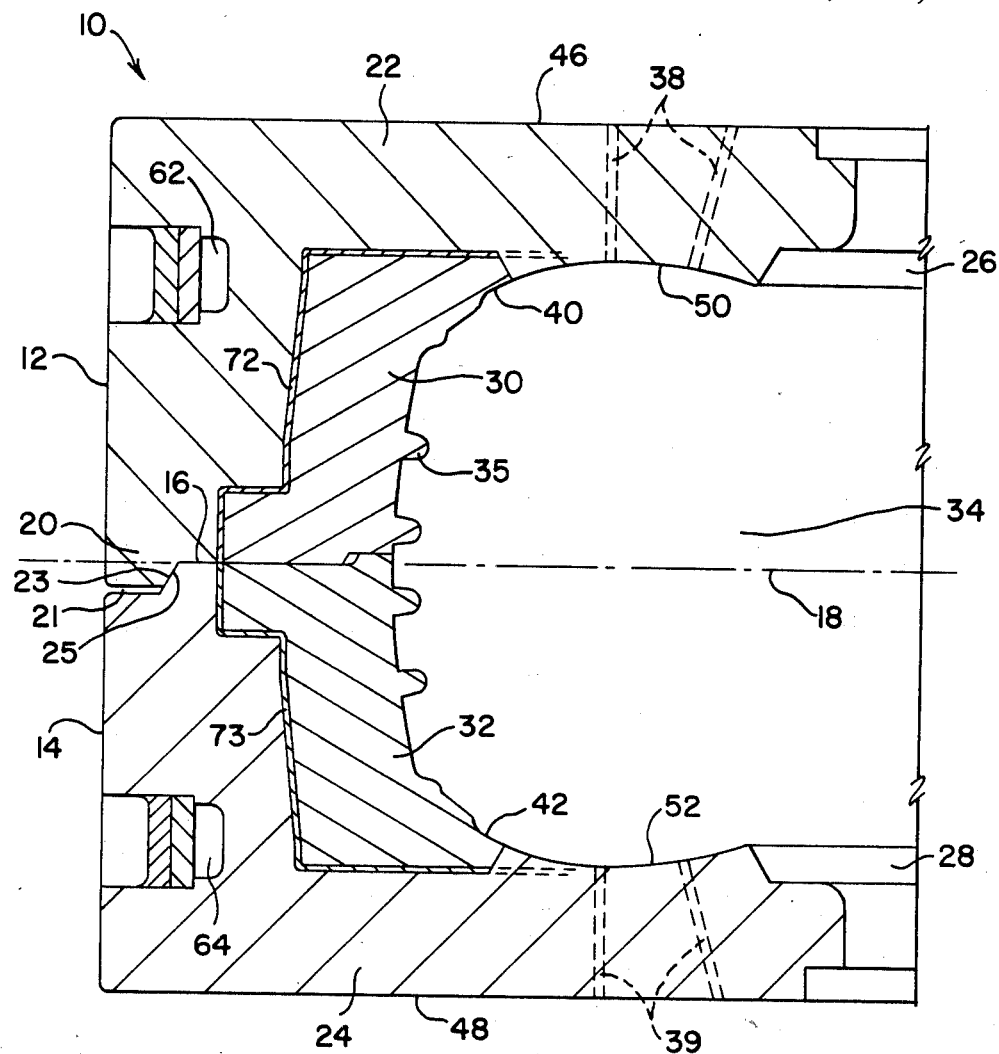
FIG. 1 shows a partial cross-sectional view of a tire mold.

In FIG. 1, a partial cross-sectional view of a pneumatic tire mold 10 is shown in a presently preferred embodiment. The tire mold 10 is designed for use in a platen press (not shown) for shaping and curing a pneumatic tire (not shown). The use of platen presses for curing pneumatic tires is well known in the art and will not be described herein. The invention is also applicable to molds used in steam-dome presses and pot heaters. The present invention is applicable to the various types of molds used in the tire industry including a sectional mold wherein a multisection mold is circumferentially enclosed with a band.

The mold 10 includes an upper or male section 12 and lower or female section 14. A parting line 16 separates the upper and lower sections 12, 14, with at least one of the sections 12, 14 being moveable in a direction perpendicular to the parting line 16 away from the remaining section. By separating the sections 12, 14, the mold 10 is opened for introducing a green tire to the mold 10.

In a conventional mold 10, the surface 46 of the upper section 12 is flat and parallel to a flat horizontal surface 48 of the lower section 14. The surfaces 46, 48 are generally parallel to the horizontal plane 18 containing the parting line 16.

Each mold section 12, 14 includes tread ring components 30, 32; mold back components 22, 24; bead ring components 26, 28; and insulator plates 72, 73. In the preferred embodiment, the tread ring components 30, 32 and the insulator plates 72, 73 are mounted on the mold back components 22, 24 by screws or other conventional means, respectively. However, other arrangements of the insulator plates 72, 73 can be utilized wherein the insulator plates 72, 73 are positioned between the source of external heat and the tire.

The upper section 12 and the lower section 14 fit together to form a toroidal mold cavity 34 with an inner shaping surface 35 of a predetermined configuration for shaping the tire.

As shown in the FIG. 1, the tread ring components 30, 32 have inclined inner surfaces 40 and 42, respectively, for shaping the shoulder portions of a tire. The surface 40 and a curved inner surface 50 of the upper section 12 shape one side of the tire, and the surface 42 and a curved inner surface 52 of the lower section 14 shape the opposite side of the tire. A series of narrow vent passages 38, 39 extend from the curved inner surfaces 50, 52 through the mold backs 22 and 24 to the flat surfaces 46, 48 for the removal of gases that may become trapped between the tire and inner shaping surface 35 of the mold cavity 34.

It is understood that the mold 10 has conventional bead ring components 26, 28 for forming the bead portions of the tire. As shown, the mold sections, 12, 14, are provided with recesses 50 and 52 to receive the conventional bead-forming rings 26 and 28. These may be held in place by screws (not shown) spaced around the circumference or by other suitable means.

The mold back 22 of the upper section 12 has a projecting key 20 and the mold back 24 of the lower section 14 has a recess 21 which is of a size to receive the key 20 wherein the mold back 24 has a tapered shoulder 23 that fits and engages a tapered inner surface 25 of the key 20 thereby aligning the mold sections 12, 14 when the mold 10 is closed.

Material generally used in the mold back 22, 24 and bead ring components 26, 28 is designated as 2618 Aluminum which has a thermal conductivity of about 120 BTU/Ft-hr-°F. at 212° F. (178.5 kcal/m-hr-°C. at 100° C.). Materials used in the tread ring components 30, 32, of the mold generally are made of material designated as 514 Aluminum which has approximately the same thermal conductivity as the 2618 Aluminum. Other tire molds may contain mold back components, tread ring components, and bead ring components made of cast ductile iron which has a thermal conductivity of about 30 BTU/Ft-hr-°F. at 212° F. (44.7 kcal/m-hr-°C. at 100° C.).

The high temperature fluid to externally cure the tire is admitted to the mold section 12, 14 by inlets (not shown) into steam chambers 62, 64 and the steam and condensate are removed from the steam chambers 62, 64 through outlets (not shown). The steam chambers 62, 64 extend circumferentially around the mold sections 12, 14. The outlet passages are located to prevent accumulation of condensate in the steam chamber and permit continual drainage of condensate from the steam chambers 62, 64.

Positioned between each tread ring 30, 32 and the corresponding mold backs 22, 24 is an insulator plate 72, 73. Each of the insulator plates 72, 73 is bolted or otherwise suitably secured to the mold backs 22, 24, respectively.

Each insulator plate 70 and 72 is designed and made out of suitable material to provide the desired thermal conductivity properties in the tread area of the mold 10. An example of such material is stainless steel which has a thermal conductivity of about 12 to about 15 BTU/ft-hr-°F. at 212° F. (about 17.9 to about 22.4 kcal/m-hr-°C. at 100° C.).

A wide variety of materials and designs are available for fabrication of the insulator plates 72, 73. The insulator plates can be designed to have flat surfaces in order to fill the space between the tread rings 30, 32 and the respective mold backs 22, 24. In one embodiment, each insulator plate 72, 73 is horizontally sectioned into 90° sections wherein a gap of about ⅛ inch (0.32 cm) occurs between each section wherein the gap allows for expansion of each section during thermal expansion.

Figure 2:
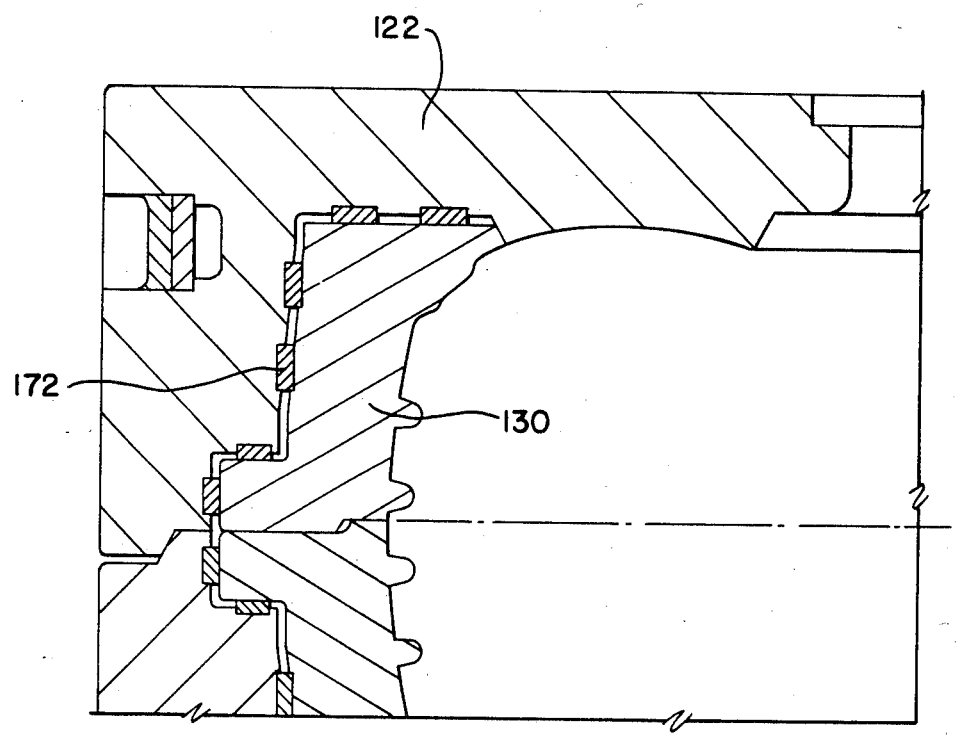
FIG. 2 shows a partial cross-sectional view of a tire mold containing an insulator plate used in a disclosed example.

In another embodiment as shown in FIG. 2, a plurality of insulator plates 172 are located between the tread ring 130 and mold back 122 wherein the insulator plates 172 are embedded in the mold back 122. However, other designs including varying thicknesses of the insulator plate, or incorporation of a "ripple" design may be used to attain the desired heat transfer properties.

Materials chosen for the insulator plates 72, 73 are dependent on the desired heat transfer properties. In one embodiment, stainless steel was chosen due to its low thermal conductivity of about 12 to about 15 BTU/Ft-hr-°F. at 212° F. (about 17.9 to about 22.4 kcal/m-hr-°C. at 100° C.) wherein the insulator plate acts to retard the flow of heat from the external heat source to the tread area of the tire.

The present invention provides modification of tire molds to allow for more desirable heat transfer from the steam chambers 62, 64 through sections 12, 14 to the green tire. The desired heat exchange from the steam chambers 62, 64 can be tailored to satisfy the low temperature requirement in the tread area for low rolling resistance tires by providing an insulator plate 72, 73 between the steam chamber 62, 64, and the tire.

The process for making a tire employing a tire mold of the present invention begins with the building of a green tire. A green tire is constructed from uncured green components upon a tire building machine in a well known manner. Typically, for radial tires, the green tire building machine includes a building drum to which a tire liner and tire body plies are applied. Material overlapping the drum is turned down and a bead assembly is applied to the edge of the building drum. The overlapping plies are then turned up over the bead package and back onto the building drum. An extruded rubber sidewall is applied to the tire plies and the carcass is expanded to a desired diameter. Reinforcing belts are then applied, an extruded tread is applied over the belts and any air trapped between the belts and the tread is removed in any suitable or conventional manner such as by a so-called "stitching" operation. The tire is now ready for vulcanization or curing.

Referring to FIG. 1, the tire mold 10 is opened by moving the sections 12, 14 apart in a direction perpendicular to the parting line 16 whereby the green tire may be placed within the toroidal mold cavity 34. Once the green tire is positioned within the mold cavity 34, the bladder (not shown) is inflated with low pressure or so-called shaping steam which causes the bladder to expand filling the green tire.

The press is then closed until the mold sections 12, 14 are fully closed wherein the curing cycle is started. The tire is then subjected to either a hot water cure or a steam cure. Under a steam cure, the bladder is filled with steam for a predetermined time during which time steam is applied externally of the mold wherein heat is transferred through the mold to the tire. Upon completion of the predetermined time for curing the tire, the steam is blown down to atmospheric pressure, the press is opened and the cured tire is removed.

This invention can be more clearly understood by way of the following example.

EXAMPLE

Radial light truck tires, size LT 225/75R15 were cured in a mold like that illustrated in FIG. 2 according to this invention.

The tires were made using standard tire building equipment. The building of the tires was standard wherein the tires include two carcass plies of rubberized polyester cords and two belts of rubberized steel cords.

The curing procedure for the LT 225/75R15 tire at an external cure temperature of 306° F. (152° C.) requires a cycle time of about 19 minutes which includes the curing sequence of an internal cure of high pressure dead end hot water cure and an external cure of 60 psig steam fill at 306° F. for about 19 minutes.

The insulator plate used in the mold were like those shown as 172 in FIG. 2 and were made of a polyester glass material known in the art as Glastherm ® Grade S insulating sheet. In each section of the mold there were six insulator plates wherein each plate extends circumferentially around the mold. Each insulator plate was embedded in the mold back wherein each was secured to the mold back by a screw (not shown) or other suitable means. Each insulator plate interfacing the tread ring on an angle are embedded in the tread ring.

Figure 3:
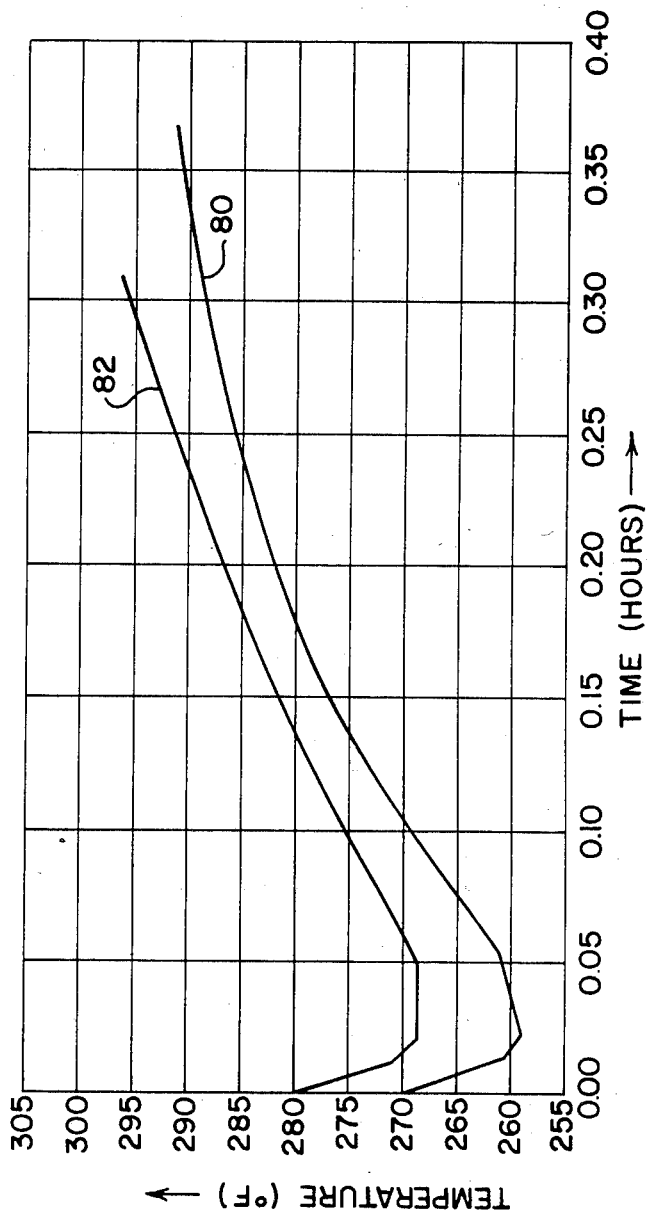
FIG. 3 shows two graphs of "temperatures" vs "time" at the interface of the bead and tire mold of the disclosed example.
Figure 4:
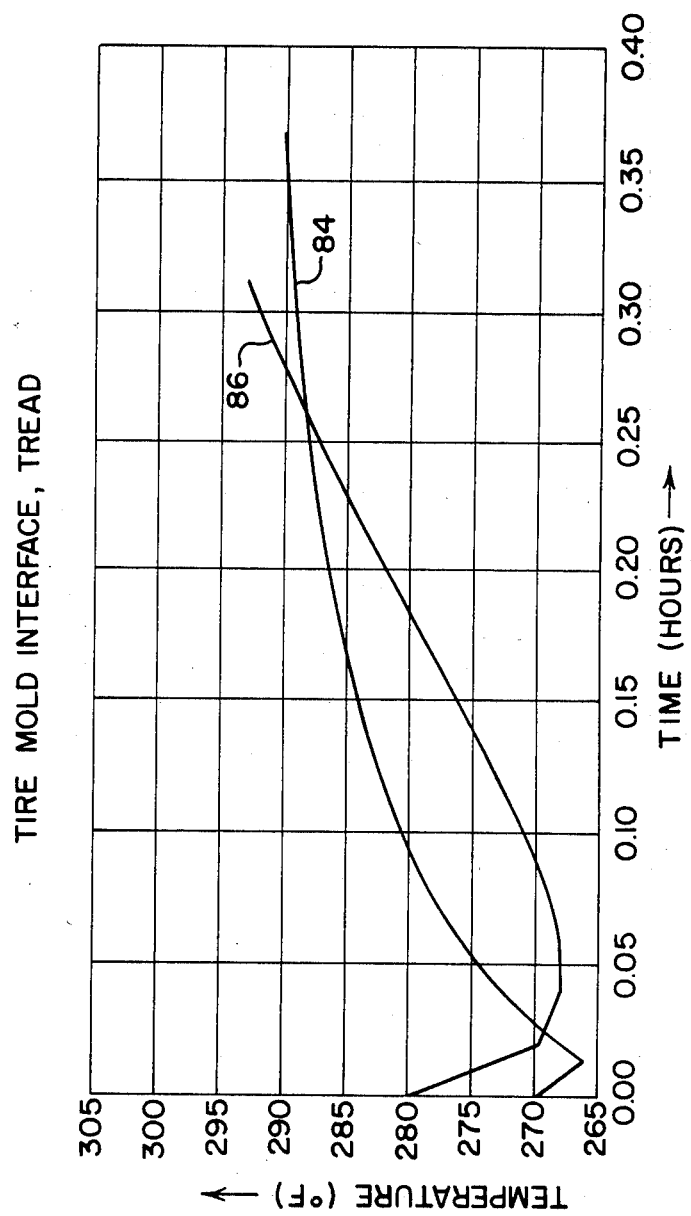
FIG. 4 shows two graphs of "temperature" vs "time" at the interface of the tread and tire mold of the disclosed example.

FIGS. 3 and 4 graphically show the difference of a cure temperature of the external source of 290° F. (143° C.) as used without the insulator plates and increasing the external temperature to 306° F. (152° C.) and the use of the plurality of insulator plates like 172 as shown in FIG. 2.

In particular, FIG. 3 depicts the difference as measured at the interface of the mold and the bead area of the LT 225/75R15 tire of 290° F. (143° C.) as shown in graph 80 and an external cure of 306° F. (152° C.) as shown in graph 82. The time difference required to cure the bead using the 306° F. (152° C.) cure is about 3 minutes less than the 290° F. (143° C.) cure.

FIG. 4 depicts the difference in curing the tread of the LT 225/75R15 tire of an external cure at the interface of the tire and the mold in the bead area of 290° F. (143° C.) as shown in graph 84 and an external cure of 306° F. (152° C.) as shown in graph 86. The decrease in temperature of the external cure found in the tread tire mold interface is attributable to the shielding of the tread area from the external heat source as depicted by the differences of graphs 84 and 86. The shielding effect reduces the amount of cure received by the rubber in the tread area during which time the rubber in the bead ring is suitably cured.

It will be understood that certain departures from and modifications to the preferred embodiments described are possible within the scope of the invention which is to be measured by the following claims.

I claim:

1. A tire mold for curing pneumatic tires, said tire mold comprising two components wherein each of said two components has a thermal conductivity; and an insulator plate which is disposed between said two components wherein said insulator plate has a thermal conductivity less than the thermal conductivity of said two components and said insulator plate is positioned between said tire and a heat source external to said tire.

2. A tire mold for curing pneumatic tires, said tire mold comprising a circumferential parting line which divides said mold into upper and lower sections with at least one of the sections being movable in a direction perpendicular to said parting line; and each section contains two components wherein each of said components has a thermal conductivity; and each section further comprises an insulator plate which is disposed adjoining said components wherein said insulator plate has a thermal conductivity less than the thermal conductivity of said adjoining components and said insulator plate is positioned between said tire and a heat source external to said tire.

3. A tire mold for curing pneumatic tires, said tire mold comprising a circumferential parting line which divides said mold into upper and lower sections with at least one of the sections being movable in a direction perpendicular to said parting line; and each section contains a tread ring component and mold back component wherein said mold back component and tread ring component each having a thermal conductivity; and each section further comprises an insulator plate which is disposed between said tire and a heat source external to said tire and between said mold back and said tread ring components wherein said insulator plate has a thermal conductivity less than the thermal conductivity of said tread ring or mold back component.

4. A tire mold of claim 3 wherein said mold back and tread ring components are of material having a thermal conductivity of about 100 BTU/Ft-hr-°F. at 212° F. (149 kcal/m-hr-°C. at 100° C.).

5. A tire mold of claim 3 wherein said mold back and tread ring components are of material having a thermal conductivity of about 30 BTU/Ft-hr-°F. at 212° F. (44.6 kcal/m-hr-°C. at 100° C.).

6. A tire mold of claim 3 wherein said insulator plate comprises a material comprising a thermal conductivity of about 12 to about 15 BTU/Ft-hr-°F. at 212° F. (about 17.9 to about 22.4 kcal/m-hr-°C. at 100° C.).

7. A tire mold of claim 3 wherein said insulator plate is a material having a thermal conductivity of about 1.7 BTU/Ft-hr-°F. at 212° F. (2.53 kcal/m-hr-°C. at 100° C.).

8. A tire mold of claim 3 wherein said mold back and said tread ring components are aluminum and said insulator plate is polyester glass material.

9. A tire mold of claim 3 wherein said mold back and said tread ring components are aluminum and said insulator plate is stainless steel material.

* * * * *